US010178219B1

(12) United States Patent
Blanco et al.

(10) Patent No.: US 10,178,219 B1
(45) Date of Patent: Jan. 8, 2019

(54) METHODS AND SYSTEMS FOR DELIVERING A VOICE MESSAGE

(71) Applicant: MOTOROLA SOLUTIONS, INC., Chicago, IL (US)

(72) Inventors: Alejandro G. Blanco, Fort Lauderdale, FL (US); David J. Ley, Plantation, FL (US); Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/629,530

(22) Filed: Jun. 21, 2017

(51) Int. Cl.
 H04W 4/00 (2018.01)
 H04M 1/725 (2006.01)
 G10L 25/78 (2013.01)

(52) U.S. Cl.
 CPC .......... H04M 1/7255 (2013.01); G10L 25/78 (2013.01); H04M 1/72569 (2013.01)

(58) Field of Classification Search
 CPC .. H04M 1/7255; H04M 1/72569; H04M 1/64; H04W 56/00; H04W 4/00; H04W 4/02; H04L 51/04; H04L 2012/5656; G10L 25/78; G10L 15/26; H04Q 7/24; G08C 17/00; G01L 19/008
 USPC ............... 455/466, 404.1; 704/235, 246, 270
 See application file for complete search history.

(56) References Cited

U.S. PATENT DOCUMENTS

| 6,144,938 | A * | 11/2000 | Surace ................. G10L 13/033 704/257 |
| 6,553,341 | B1 | 4/2003 | Mullaly et al. |
| 6,708,153 | B2 * | 3/2004 | Brittan .................... G10L 13/08 379/88.01 |
| 7,672,436 | B1 * | 3/2010 | Thenthiruperai . H04M 1/72552 379/88.04 |
| 8,270,954 | B1 * | 9/2012 | Breau ............... H04M 3/42204 455/414.2 |

(Continued)

FOREIGN PATENT DOCUMENTS

| EP | 2898509 A1 * | 7/2015 | .......... G10L 19/008 |
| WO | WO 2016171574 A1 * | 10/2016 | .......... H04M 11/066 |

OTHER PUBLICATIONS

Bhatia et al., "Listening to your inner voices: Investigating means for voice notifications." In Proceedings of the 2006 ACM Conference on Human Factors in Computing Systems (CHI '06), Montreal Canada, Apr. 2006, pp. 1173-1176., http://people.cs.vt.edu/~mccricks/papers/bm06chi-final.pdf.

(Continued)

*Primary Examiner* — Mahendra Patel
(74) *Attorney, Agent, or Firm* — Michael Best & Friedrich LLP (57) ABSTRACT

Methods and systems for delivering a voice message. One method includes determining, by an electronic computing device, an environmental condition of a user. The method further includes generating, by the electronic computing device, a voice message based on the environmental condition such that the voice message includes an encoded meaning. The method further includes determining, by the electronic computing device, a voice profile of the voice message based on the environmental condition. The voice profile indicates the encoded meaning. The method further includes outputting the voice message in accordance with the voice profile with a speaker of a communication device.

20 Claims, 3 Drawing Sheets

(56) References Cited

U.S. PATENT DOCUMENTS

| | | | |
|---|---|---|---|
| 8,843,369 B1* | 9/2014 | Sharifi | G10L 25/03 |
| | | | 704/235 |
| 2006/0215831 A1* | 9/2006 | Knott | H04M 3/493 |
| | | | 379/211.02 |
| 2007/0265946 A1 | 11/2007 | Schimpf et al. | |
| 2008/0065387 A1 | 3/2008 | Cross, Jr. et al. | |
| 2008/0291855 A1* | 11/2008 | Bata | H04W 52/0219 |
| | | | 370/311 |
| 2010/0145702 A1* | 6/2010 | Karmarkar | H04L 51/38 |
| | | | 704/258 |
| 2012/0271640 A1* | 10/2012 | Basir | H04M 1/6075 |
| | | | 704/275 |
| 2013/0275899 A1* | 10/2013 | Schubert | G06F 3/0481 |
| | | | 715/765 |
| 2014/0200896 A1* | 7/2014 | Lee | G06F 3/167 |
| | | | 704/270.1 |
| 2015/0356978 A1* | 12/2015 | Dickins | G10L 19/008 |
| | | | 704/226 |
| 2016/0246979 A1 | 8/2016 | Rakshit | |
| 2017/0127274 A1 | 5/2017 | Lin et al. | |
| 2017/0200455 A1* | 7/2017 | Aggarwal | G10L 21/00 |

OTHER PUBLICATIONS

PCT/US2018/033725 International Search Report and Written Opinion of the International Searching Authority dated Aug. 10, 2018 (17 pages).

* cited by examiner

METHODS AND SYSTEMS FOR DELIVERING A VOICE MESSAGE

BACKGROUND OF THE INVENTION

Tablets, laptops, phones (for example, cellular or satellite), mobile (vehicular) or portable (personal) two-way radios, and other communication devices are now in common use by users, such as first responders (including firefighters, police officers, and paramedics, among others), and provide such users and others with access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Voice messages provided from an electronic digital assistant may include sensitive or confidential information in some situations. For example, in a public safety context, a voice message may include details of a public safety incident intended to be communicated to public safety officers (for example, firefighters, police officers, paramedics, and the like) and not to civilians. As another example, a voice message may include a location of an undercover public safety operation or personal information of a public safety officer. Such information may only be intended to be conveyed to public safety officers. However, public safety officers may often be in situations that lack privacy such that non-public safety personnel (for example, civilians, criminals, and the like) are able to hear voice messages intended for public safety officers. For example, a suspect in the back of a police vehicle may overhear a voice message received and output by a mobile radio in the police vehicle. As another example, civilians located near a public safety officer handling an incident (for example, a public safety officer performing crowd control) may overhear a voice message received and output by a portable radio carried by the public safety officer.

Disclosed are a method, device, and system for an electronic digital assistant to deliver a voice message. The electronic digital assistant may generate a voice message based on an environmental condition of a user such that the voice message includes an encoded meaning that is indicated by a voice profile in which the voice message is output.

One embodiment provides a method for delivering a voice message. The method includes determining, by an electronic computing device, an environmental condition of a user. The method further includes generating, by the electronic computing device, a voice message based on the environmental condition such that the voice message includes an encoded meaning. The method further includes determining, by the electronic computing device, a voice profile of the voice message based on the environmental condition. The voice profile indicates the encoded meaning. The method further includes outputting the voice message in accordance with the voice profile with a speaker of a communication device.

Another embodiment provides an electronic computing device that includes one or more electronic processors. The one or more electronic processors are configured to determine an environmental condition of a user. The one or more electronic processors are further configured to generate a voice message based on the environmental condition such that the voice message includes an encoded meaning. The one or more electronic processors are further configured to determine a voice profile of the voice message based on the environmental condition. The voice profile indicates the encoded meaning. The one or more electronic processors are further configured to output the voice message in accordance with the voice profile with a speaker of a communication device.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1:
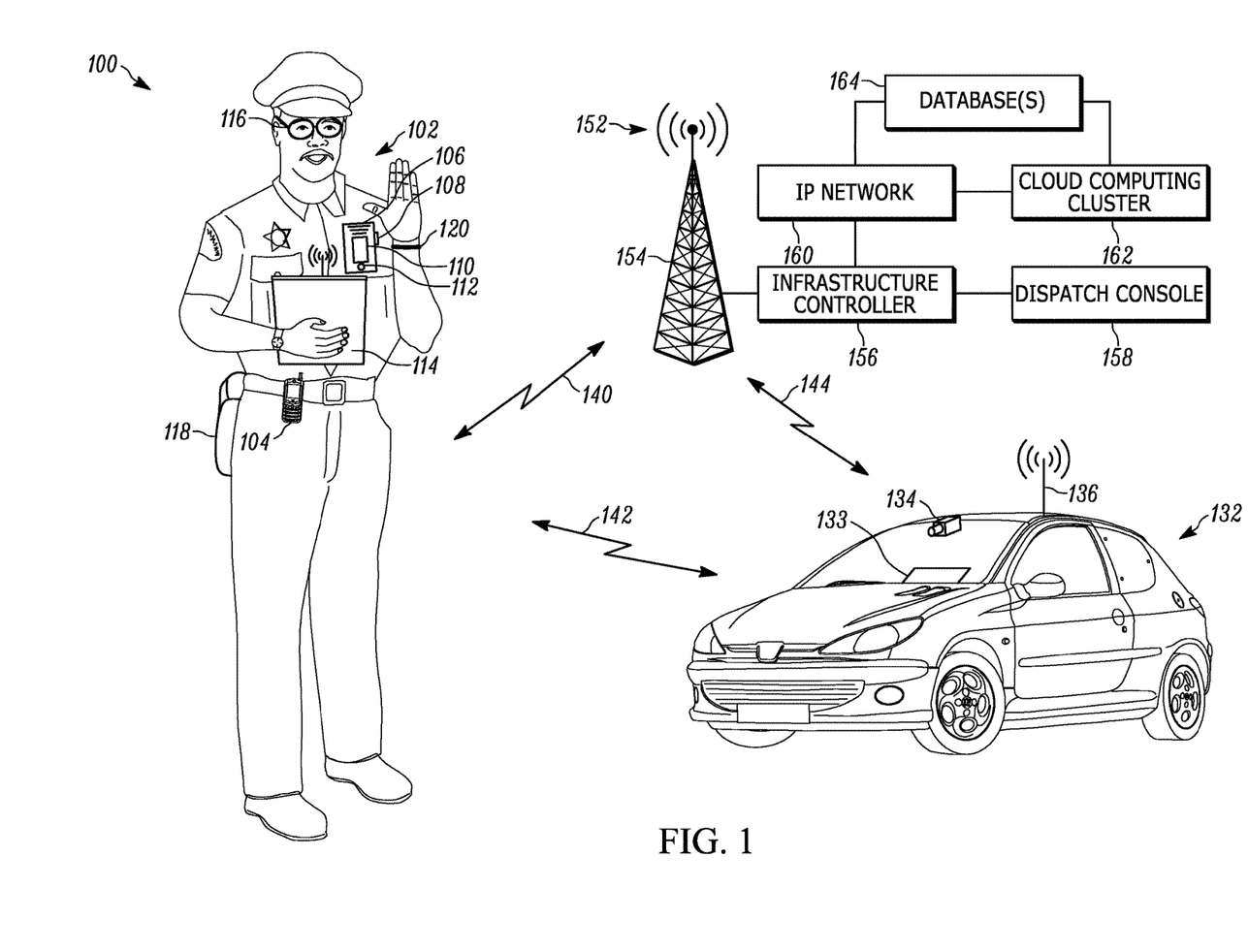
FIG. 1 is a system diagram illustrating a system for operating an electronic digital assistant, in accordance with some embodiments.

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and an imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other device in FIG. 1 for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. In some embodiments, the vehicle 132 may include one or more occupant sensors that sense, for example, whether a seat is occupied. For example, an occupant sensor in the back seat of a police vehicle may indicate whether a suspect is present in the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133, the vehicular video camera 134, and/or the one or more occupant sensors in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone 135, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and interne protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud computing cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

As shown in FIG. 1, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

b. Device Structure

Figure 2:
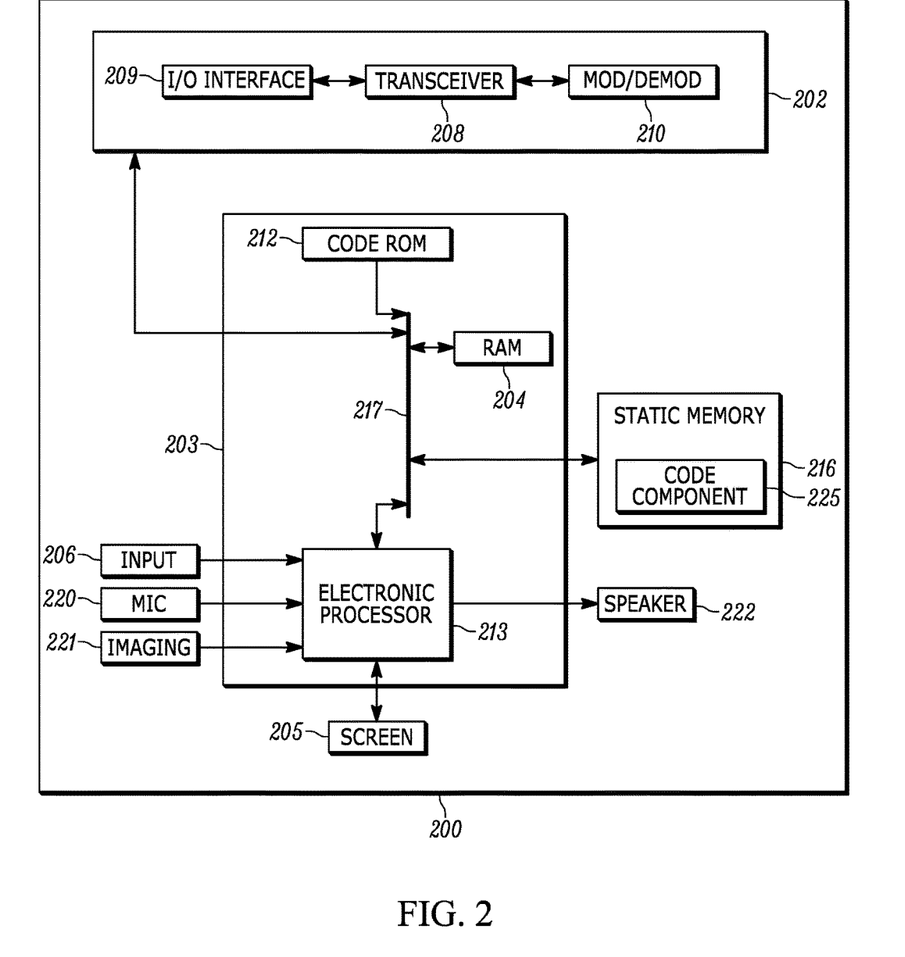
FIG. 2 is a device diagram showing a device structure of a communication device of the system of FIG. 1 in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200. As another example, the mobile communication device 133 may be communicatively coupled to an occupant sensor of the vehicle 132, and the combination may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, the communication devices 200 acting as the infrastructure controller 156 may not include one or more of the screen 205, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text. In some embodiments, the static memory 216 may also store, permanently or temporarily, voice data corresponding to a plurality of voice profiles as explained in greater detail below with respect to FIG. 3. In other embodiments, the voice data may be stored on a memory of one or more other devices (for example, a memory of the infrastructure controller 156 or a memory of a back-end device in the cloud computing cluster 162).

The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Delivering a Voice Message That Includes an Encoded Meaning Using a Voice Profile Based on an Environmental Condition of the User In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via an IP network 160.

To use the electronic digital assistant implemented by the electronic computing device, the user 102 may, for example, provide an oral query that is received by the microphone 220 of the communication device 200. The electronic computing device receives signals representative of the oral query from the microphone 220 and analyzes the signals to determine the content of the oral query. For example, the electronic computing device may include a natural language processing (NLP) engine configured to determine the intent and/or content of the oral query. The electronic computing device may also be configured to determine a response to the oral query (for example, by retrieving stored data or by requesting data from a database such as the database 164) and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1, such as the portable radio 104, the infrastructure controller 156, and the cloud computing cluster 162, may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 may submit a text query to the electronic computing device by typing the text query into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video. In some embodiments, the electronic computing device may receive information from a communication device 200 of another user or from another electronic computing device (for example, a call or a message from another user).

In some embodiments, the user query and/or the received information may relate to public safety information. For example, the user query and/or the received information may relate to a past or current public safety incident in which public safety officers (for example, firefighters, police officers, paramedics, and the like) engage in to protect the public and keep the public safe (for example, a building fire, a criminal pursuit or other law enforcement event, a natural disaster, a medical incident, a traffic accident, and the like). For example, the received information may include a request for a back-up or a location to which a public safety officer should report. As another example, the user query and/or the received information may include other public safety-related information such as information relating to a criminal or information relating to a recommended public safety procedure.

As explained above, voice messages provided from the electronic digital assistant implemented by the electronic computing device may include sensitive or confidential information (in other words, information that is intended to be conveyed only to public safety officers). However, public safety officers may often be in situations that lack privacy such that non-public safety personnel (for example, civilians, criminals, and the like) are able to overhear voice messages intended for public safety officers. For example, a suspect in the back of a police vehicle may overhear a voice message received and output by a mobile radio in the police vehicle.

Figure 3:
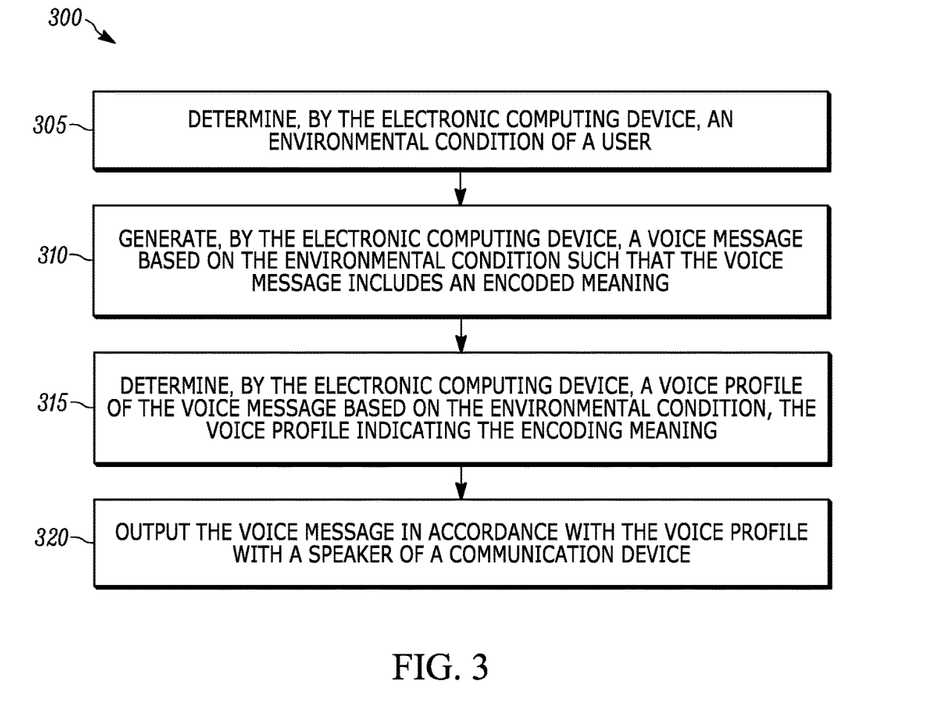
FIG. 3 illustrates a flow chart of a method of delivering a voice message in accordance with some embodiments.

To deliver a voice message that includes an encoded meaning using a voice profile based on an environmental condition of the user 102, the electronic computing device that implements the electronic digital assistant may perform a method 300 illustrated in FIG. 3.

FIG. 3 illustrates a flow chart diagram of the method 300 performed by the electronic computing device for delivering a voice message that includes an encoded meaning using a voice profile based on an environmental condition of the user 102. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic computing device determines an environmental condition of the user 102. In some embodiments, the environmental condition of the user 102 indicates a likelihood that another person is likely to overhear a voice message output by a communication device 200 associated with the user 102. In some embodiments, the electronic computing device determines the environmental condition of the user 102 based on a type of output device on which the voice message is configured to be output. For example, when a voice message is configured to output via a loudspeaker, the electronic computing device determines that another person is likely to overhear the voice message.

In some embodiments, the environmental condition of the user 102 indicates a privacy level of the user 102 (in other words, whether there are other people located in the vicinity of the user 102 that may be able to overhear a voice message). For example, the microphone 220 of the communication device 200 associated with the user 102 detects voices from people other than the user 102. When the detected voices are unrecognized, the electronic computing device may determine that other people are located in the vicinity of the user 102 (in other words, another person is likely to overhear a voice message output by the communication device 200).

In some embodiments, the environmental condition of the user 102 indicates whether other people located in the vicinity of the user 102 are public safety personnel. In such embodiments, the electronic computing device determines whether the people located in the vicinity of the user 102 are public safety personnel (for example, firefighters, police officers, and the like) or non-public safety personnel (citizens, criminals, and the like). For example, the electronic computing device determines that audible words or topics detected by the microphone 220 have a tendency to be associated with public safety personnel. In such a situation, the electronic computing device determines that the people in the vicinity of the user 102 are also public safety personnel. On the other hand, when the electronic computing device determines that audible words detected by the microphone 220 have a tendency to be associated with citizens, the electronic computing device determines that the people in the vicinity of the user 102 are non-public safety personnel. Such a situation may be referred to as a compromised situation. An example of a compromised situation is when a criminal is seated in the vehicle 132 associated with the user 102. In such a situation, the criminal may be able to overhear voice messages provided to the user 102 via the mobile communication device 133. In some embodiments, the mobile communication device 133 (in other words, a communication device 200 associated with the user 102) determines that the user 102 is in a compromised situation based on a sensor input indicating the presence of non-public safety personnel. For example, the electronic computing device receives sensor data by communicating with the occupant sensor of the vehicle 132.

At block 310, the electronic computing device generates a voice message based on the environmental condition such that the voice message includes an encoded meaning. For example, when the electronic computing device determines that the user 102 is in a compromised situation where another person (such as non-public safety personnel) is likely to overhear the voice message, the electronic computing device generates a voice message that includes an encoded meaning.

The electronic computing device generates the voice message for a variety of different purposes. In some embodiments, the electronic computing device generates the voice message as a response to a user query received by the electronic computing device (for example, when the user 102 asks a question or requests information from the electronic digital assistant). In some embodiments, the response to the user query includes information intended to be conveyed to the user 102 that is encoded by the electronic computing device before being output as a voice message as explained in greater detail below. In some embodiments, the user query relates to public safety information.

In some embodiments, the electronic computing device generates the voice message in response to receiving a message from a communication device 200 of another user or from another electronic computing device. In some embodiments, the received message includes information intended to be conveyed to the user 102. In some embodiments, the electronic computing device generates an updated version of the received message based on the environmental condition of the user 102. The updated version of the received message may be different than the received message and may include an encoded meaning that represents the information included in the received message as described in detail below. In some embodiments, the received message relates to public safety information.

At block 315, the electronic computing device determines a voice profile of the voice message based on the environmental condition. The voice profile indicates the encoded meaning of the voice message as explained in greater detail below. In some embodiments, the voice profile is a voice of a person in which a voice message is provided. Example voice profiles include a male voice, a female voice, a voice of a supervisor of the user 102, a voice of a co-worker of the user 102, a voice of a spouse of the user 102, a celebrity voice, a voice with a certain accent, and the like. In some embodiments, the voice profile indicates the approximate age of the person whose voice makes up the voice profile (for example, a voice of a child or a voice of an elderly person). In some embodiments, the user's 102 own voice is stored as a voice profile. In some embodiments, the voice profile may be output in a predetermined manner to indicate the encoded meaning of the voice message (for example, characteristics of the predetermined manner of the voice output may include a volume of the voice, a tone of the voice, a shouting voice, a whispering voice, and the like). As mentioned previously, in some embodiments, voice data corresponding to a plurality of voice profiles is stored on one or more of a memory of the communication device 200, a memory of the infrastructure controller 156, or a memory of a back-end device in a the cloud computing cluster 162.

The electronic computing device determines a voice profile of the voice message based on the environmental condition of the user 102 determined at block 305. In some embodiments, when the electronic computing device determines that the user 102 is in a compromised situation, the electronic computing device generates the voice message to include an encoded meaning that is understandable to the user 102 based on the voice profile in which the voice message is provided.

In some embodiments, the voice profile indicates the accuracy of information included in the voice message. For example, the voice profile indicates that the encoded meaning of the voice message is the opposite meaning of the information included in the voice message. For example, a voice message that states "no back-up is required," in the voice of a predetermined celebrity indicates that back-up is required. Alternatively, a voice message that states "no back-up is required," in the voice of the spouse of the user 102 indicates that back-up is not required.

In some embodiments, the voice profile indicates that the information included in the voice message is irrelevant and that the voice profile itself conveys information intended to be conveyed to the user 102. In other words, the voice profile itself conveys a predetermined meaning to the user 102. For example, a voice message in the voice of the supervisor of the user 102 indicates that the user 102 should return to a command center regardless of the information stated in the voice message.

In some embodiments, the voice profile indicates that the voice message includes jargon or truncated language that has a predetermined meaning based on the voice profile. For example, the voice message includes words that have multiple alternate meanings known by public safety personnel and indicated by the voice profile. For example, the word "punk" stated by a male celebrity voice indicates that a suspect is uncooperative. However, the word "punk" stated by a female celebrity voice may indicate that the suspect is frightened. As illustrated by the previous example, the same word may have a different encoded meaning in different voice messages as indicated to the user 102 by the voice profile.

In some embodiments, the user 102 or a public safety agency enters settings on the communication device 200 or pre-configures settings on the electronic computing device to associate different voice profiles with different encoded meanings.

In some embodiments, the electronic computing device generates the voice message and determines the voice profile of the voice message based on a sensitivity level of the information intended to be conveyed to the user 102. In such embodiments, the information intended to be conveyed to the user 102 may be categorized as one of the group consisting of confidential information (for example, information relating to an undercover operation), private information (for example, a public safety communication relating to a public safety incident), or public information (for example, information relating to the weather). In such embodiments, different levels of encoding complexity may be used for each sensitivity level of the information. For example, a voice message intending to convey public information to the user 102 may not include an encoded meaning. In other words, the information stated in the voice message may be the information intended to be conveyed to the user 102. As another example, a voice message intending to convey private information is encoded in a first manner (for example, the intended meaning of the voice message is the opposite of the information included in the voice message as explained previously). As another example, a voice message intending to convey confidential information to the user 102 is encoded in a second manner that may be more difficult to decode than the voice message encoded in the first manner. For example, the voice message encoded in the second manner may include jargon that has a predetermined meaning known to the user 102, but is unlikely to be known by others. In these previous examples, the electronic computing device selects the voice profile to indicate the corresponding encoded meaning to the user 102 as described above.

These sensitivity levels are mere examples. In some embodiments, the sensitivity levels include fewer or additional levels (for example, a scale from one to ten). In some embodiments, the user 102 enters settings on the communication device 200 to control the categorization of information into the sensitivity levels by the electronic computing device. For example, the user 102 enters settings to instruct the electronic computing device to categorize a selected type of voice message or a voice message from a selected user as private information and encode the meaning of the voice message accordingly.

In some embodiments, the electronic computing device determines a priority level of the information intended to be conveyed to the user 102 and determines the voice profile of the voice message based on the priority level. In some embodiments, the priority levels are low, medium, and high. For example, a voice message stated in the voice of the supervisor of the user 102 may indicate that the voice message is of high priority (for example, when the voice message is associated with an ongoing public safety incident where back-up is desired). As another example, a voice message stated in the voice of a predetermined celebrity may indicate that the voice message is of low priority (for example, when the voice message is associated with a response to a user query relating to the weather).

These priority levels are mere examples. In some embodiments, the priority levels include fewer or additional levels (for example, a scale from one to ten). In some embodiments, the user 102 may enter settings on the communication device 200 to control the categorization of information into the priority levels by the electronic computing device. For example, the user 102 may enter settings to instruct the electronic computing device to categorize a selected type of voice message or a voice message from a selected user as being of high priority and encode the meaning of the voice message accordingly. In some embodiments, a public safety agency, such as a fire department or a police department, may enter these settings and/or other settings to, for example, define the relationship between the voice profiles and their respective encoded meanings.

In some embodiments, the voice profile indicates one or more of an encoded meaning of the voice message, a sensitivity level of the information intended to be conveyed to the user 102, a priority level of the information intended to be conveyed to the user 102, and the like.

At block 320, the electronic computing device outputs the voice message in accordance with the voice profile (determined at block 315) with the speaker 222 of the communication device 200 associated with the user 102. In some embodiments, the electronic computing device additionally or alternatively outputs the encoded meaning of the voice message with another output device of the communication device 200 (for example, the screen 205, a vibration device, and the like). For example, the electronic computing device causes the screen 205 to display text that indicates that the encoded meaning of the voice message is the opposite of the information stated in the voice message. As another example, the communication device 200 provides haptic feedback with a vibration device that indicates the encoded meaning of the voice message (for example, a predetermined number of vibrations indicates a certain manner of encoding of the voice message).

In some embodiments, the communication device 200 of the user 102 is included in a talkgroup that includes a plurality of communication devices 200. In such embodiments, the electronic computing device determines an environmental condition of a plurality of or all of the communication devices 200 within the talkgroup. In some embodiments, the electronic computing device generates the voice message and determines the voice profile of the voice message based on the environmental condition of at least one of the communication devices 200 of the talkgroup. For example, when the environmental condition of a user of one communication device in the talkgroup indicates that the user is in a compromised situation, the electronic computing device generates the voice message and determines the voice profile to encode information intended to be conveyed to the user. The electronic computing device then outputs the voice message in accordance with the voice profile to the talkgroup. In such embodiments, some communication devices 200 in the talkgroup receive a voice message with an encoded meaning even when the users of the communication devices are not in a compromised situation. However, the users of such communication devices 200 are able to understand the message because the voice profile indicates the encoded meaning of the voice message as explained previously. In some embodiments, the encoded meaning of the voice profile indicates which of the users in the talkgroup are in a compromised situation. For example, a voice message in a certain voice profile may indicate that the user who transmitted the voice message is in a compromised situation. As another example, a voice message in a different voice profile may indicate that a police chief or a team leader is in a compromised situation.

In some embodiments, after the voice message is output by the speaker 222 of the communication device 200, the electronic computing device determines that a device under the control of the user 102 is not acting in accordance with the information intended to be conveyed to the user 102 by the voice message. For example, the information intended to be conveyed to the user 102 by the voice message may indicate that back-up is requested at a first location. When the electronic computing device determines that the user 102 did not respond to the voice message or that the user 102 has not begun driving the vehicle 132 in a direction toward the first location, the electronic computing device determines that the user 102 is not acting in accordance with the voice message. As another example, the information intended to be conveyed to the user 102 by the voice message may include a request for a verbal response from the user 102. When the electronic computing device does not receive a verbal response from the user 102 for a predetermined amount of time after the voice message was output, the electronic computing device determines that the user 102 is not acting in accordance with the voice message.

When such a determination is made, the electronic computing device determines a second voice profile that is different than the first voice profile that was used to output the first voice message. The electronic computing device then outputs a second voice message in accordance with the second voice profile with the speaker 222 of the communication device 200.

Although the second voice profile is different than the first voice profile, in some embodiments, the second voice profile indicates the same encoded meaning as the first voice profile. In such embodiments, the information included in the second voice message may be the same as the information included in the first voice message, but the voice messages are stated in different voice profiles. Changing the voice profile of the second voice message helps gain or catch the attention of the user 102 who may not have heard and/or understood the first voice message. In other embodiments, the electronic computing device generates a second voice message that includes information different than the first voice message and includes a different encoded meaning and a different voice profile than the first voice message. Changing the information included in the voice message, the encoded meaning of the voice message, and the voice profile of the voice message helps or allows the user 102 to accurately interpret the information intended to be conveyed when the user 102 may have incorrectly interpreted the first voice message.

In some embodiments, when the electronic computing device determines that the user 102 did not hear or understand the voice message or is not acting in accordance with the voice message, the electronic computing device outputs a second voice message in the voice of the user 102. Changing the voice profile of the second voice message to be the user's 102 own voice helps gain or catch the attention of the user 102. In some embodiments, the electronic computing device re-generates the information included in the second voice message such that the information included in the second voice message corresponds to an encoded meaning indicated by the voice profile being the user's 102 own voice.

In some embodiments, the environmental condition of the user 102 detected at block 305 indicates a stress level of the user 102 or a noise level of an area near the user 102. For example, the electronic computing device determines the stress level of the user 102 based on one or more biometric measurements from the biometric sensor wristband 120. The electronic computing device then determines a voice profile of the voice message at least partially based on the stress level of the user 102. For example, the voice of the spouse of the user 102 is likely to gain or catch the attention of the user 102 even in a high stress situation. Similarly, the electronic computing device may determine the noise level of an area near the user 102 based on signals received from the microphone 220. The electronic computing device then determines a voice profile of the voice message at least partially based on the noise level in the area near the user 102. For example, the voice of a celebrity is likely to gain or catch the attention of the user 102 even in an area with a high noise level. In some embodiments, these examples of determining a voice profile in which to output a voice message may be used in combination with the voice profile determination examples set forth above with respect to block 315.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ... a," "has ... a," "includes ... a," or "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for delivering a voice message based on an event, the method comprising:
    determining, by an electronic computing device, an environmental condition of a user;
    generating, by the electronic computing device, a voice message based on the environmental condition such that the voice message includes an encoded meaning;
    determining, by the electronic computing device, a voice profile of the voice message based on the environmental condition, the voice profile indicating the encoded meaning; and
    outputting the voice message in a voice of the voice profile with a speaker of a communication device, the outputted voice indicating the encoded meaning, wherein the voice profile is a different voice profile than a voice profile corresponding to a voice of the user.

2. The method of claim 1, wherein the event includes receiving, with the electronic computing device, a user query relating to public safety information;
    wherein generating the voice message includes generating a response to the user query.

3. The method of claim 1, wherein the event includes receiving, with the electronic computing device, a message relating to public safety information;
    wherein generating the voice message includes generating an updated version of the received message based on the environmental condition.

4. The method of claim 1, wherein generating the voice message includes generating the voice message including information, the voice profile indicating at least one selected from the group consisting of:
    that the encoded meaning of the voice message is the opposite meaning of the information included in the voice message,
    that the voice message includes jargon that has a predetermined meaning based on the voice profile, and
    that the information included in the voice message is irrelevant and that the voice profile conveys information intended to be conveyed to the user.

5. The method of claim 1, further comprising outputting the encoded meaning with an output device of the communication device.

6. The method of claim 1, wherein determining the voice profile of the voice message includes determining the voice profile of the voice message based on a sensitivity level of information to be conveyed to the user.

7. The method of claim 1,
    wherein determining the environmental condition of the user includes determining a privacy level of the user based on at least one of the group consisting of a type of output device on which the voice message is configured to be output, detection of unrecognized voices, detection of audible words, and a sensor input indicating the presence of non-public safety personnel.

8. The method of claim 1, wherein outputting the voice message in accordance with the voice profile includes outputting the voice message in accordance with the voice profile to a talkgroup including the communication device.

9. The method of claim 1, wherein determining the voice profile of the voice message includes determining a priority level of information to be conveyed to the user, and determining the voice profile of the voice message based on the priority level.

10. The method of claim 1, further comprising:
determining, by the electronic computing device, that a device under the control of the user is not acting in accordance with information intended to be conveyed to the user by the voice message;
determining, by the electronic computing device, a second voice profile different than the voice profile; and
outputting a second voice message in accordance with the second voice profile with the speaker of the communication device.

11. An electronic computing device configured to deliver a voice message based on an event, the electronic computing device comprising:
one or more electronic processors configured to determine an environmental condition of a user;
generate the voice message based on the environmental condition such that the voice message includes an encoded meaning;
determine a voice profile of the voice message based on the environmental condition, wherein the voice profile indicates the encoded meaning; and
output the voice message in a voice of the voice profile with a speaker of a communication device, wherein the outputted voice indicates the encoded meaning, wherein the voice profile is a different voice profile than a voice profile corresponding to a voice of the user.

12. The electronic computing device of claim 11, wherein the event includes receiving a user query;
wherein the one or more electronic processors are further configured to receive the user query, wherein the user query relates to public safety information;
wherein information intended to be conveyed to the user by the voice message is generated in response to the user query.

13. The electronic computing device of claim 11, wherein the event includes receiving, with the one or more electronic processors, a message relating to public safety information;
wherein the voice message is an updated version of the received message generated based on the environmental condition.

14. The electronic computing device of claim 11, wherein the voice message includes information and the voice profile indicates at least one selected from the group consisting of:
that the encoded meaning of the voice message is the opposite meaning of the information included in the voice message,
that the voice message includes jargon that has a predetermined meaning based on the voice profile, and
that the information included in the voice message is irrelevant and that the voice profile conveys information intended to be conveyed to the user.

15. The electronic computing device of claim 11, wherein the one or more electronic processors are further configured to output the encoded meaning with an output device of the communication device.

16. The electronic computing device of claim 11, wherein the one or more electronic processors are configured to determine the voice profile of the voice message based on a sensitivity level of information to be conveyed to the user.

17. The electronic computing device of claim 11, wherein the one or more electronic processors are configured to determine the environmental condition of the user by determining a privacy level of the user based on at least one of the group consisting of a type of output device on which the voice message is configured to be output, detection of unrecognized voices, detection of audible words, and a sensor input indicating the presence of non-public safety personnel.

18. The electronic computing device of claim 11, wherein the one or more electronic processors are configured to output the voice message in accordance with the voice profile to a talkgroup including the communication device.

19. The electronic computing device of claim 11, wherein the one or more electronic processors are configured to determine the voice profile of the voice message based on a priority level of information to be conveyed to the user.

20. The electronic computing device of claim 11, wherein the one or more electronic processors are further configured to:
determine that a device under the control of the user is not acting in accordance with information intended to be conveyed to the user by the voice message;
determine a second voice profile different than the voice profile; and
output a second voice message in accordance with the second voice profile with the speaker of the communication device.

* * * * *